US012686106B2

(12) United States Patent
Imaizumi

(10) Patent No.: US 12,686,106 B2
(45) Date of Patent: Jul. 21, 2026

(54) NAILER AND DRIVER FOR NAILER

(71) Applicant: Fine Steel Engineering Co., Ltd., Yokohama (JP)

(72) Inventor: Keijiro Imaizumi, Yokohama (JP)

(73) Assignee: Fine Steel Engineering Co., Ltd., Kanagawa (JP)

( * ) Notice: Subject to any disclaimer, the term of this patent is extended or adjusted under 35 U.S.C. 154(b) by 1 day.

(21) Appl. No.: 19/102,130

(22) PCT Filed: Aug. 3, 2023

(86) PCT No.: PCT/JP2023/028428

§ 371 (c)(1),
(2) Date: Feb. 7, 2025

(87) PCT Pub. No.: WO2024/034517

PCT Pub. Date: Feb. 15, 2024

(65) Prior Publication Data

US 2026/0042194 A1 Feb. 12, 2026

(30) Foreign Application Priority Data

Aug. 12, 2022 (JP) ................................ 2022-128912

(51) Int. Cl.
*B25C 1/06* (2006.01)
*B25C 1/04* (2006.01)

(52) U.S. Cl.
CPC ................ *B25C 1/047* (2013.01); *B25C 1/06* (2013.01)

(58) Field of Classification Search
CPC ................................. B25C 1/047; B25C 1/06
USPC ........................................................ 227/130
See application file for complete search history.

(56) References Cited

U.S. PATENT DOCUMENTS 3,850,359 A * 11/1974 Obergfell .................. B25C 1/08 60/632
4,075,850 A * 2/1978 Nakazato .................. F01L 9/10 60/633
4,867,366 A * 9/1989 Kleinholz ............... B25C 1/044 227/66

(Continued)

FOREIGN PATENT DOCUMENTS

JP 200125980 A 1/2001
JP 3693268 B2 9/2005

(Continued)

OTHER PUBLICATIONS

Japan Patent Office (ISA/JP), International Search Report and Written Opinion in PCT/JP2023/028428, dated Sep. 12, 2023.

*Primary Examiner* — Nathaniel C Chukwurah
(74) *Attorney, Agent, or Firm* — Timothy W. Menasco, Esq.; Harter Secrest & Emery LLP

(57) ABSTRACT

To provide a nailer and a driver for a nailer that is reduced in weight and will produce a reduced burden on the user due to reaction to the driving action for driving in nails. A nailer includes a cylinder a piston a pressure accumulation chamber defined in the cylinder and a driver coupled to the piston. The driver includes a distal end portion configured to hit a nail a base end portion to which the piston is fixed, and an intermediate portion between the distal end portion and the base end portion. The distal end portion and the base end portion are solid and the intermediate portion has a cavity.

17 Claims, 4 Drawing Sheets

(56) References Cited

U.S. PATENT DOCUMENTS

| | | | | |
|---|---|---|---|---|
| 5,647,525 | A * | 7/1997 | Ishizawa | B25C 1/00 227/119 |
| 11,648,653 | B2 | 5/2023 | Baba | |

FOREIGN PATENT DOCUMENTS

| | | | |
|---|---|---|---|
| JP | 2007216339 | A | 8/2007 |
| JP | 2010188492 | A | 9/2010 |
| JP | 2021160028 | A | 10/2021 |
| JP | 2021171899 | A | 11/2021 |

* cited by examiner

NAILER AND DRIVER FOR NAILER

CROSS-REFERENCE TO RELATED APPLICATIONS

This application is a National Phase Entry of PCT International Application No. PCT/JP2023/028428 filed on Aug. 3, 2023, which claims priority under 35 U.S.C § 119(a) to Japanese Patent Application No. 2022-128912 filed on Aug. 12, 2022. Each of the above applications is hereby expressly incorporated by reference, in its entirety, into the present application.

TECHNICAL FIELD

The present disclosure relates to a nailer for driving in nails during construction and other similar processes and a driver for such a nailer.

BACKGROUND ART

In construction sites, various nailers are conventionally used to drive nails into wood and other building materials. Such a nailer generally includes a hammer member (driver) to strike a nail positioned ready to be driven into an object, and drive means to drive the driver.

Examples of such conventional, widely used nailers may include a nailer having a nailer body connected to a compressor through an air hose and a driver configured to driven by air pressure from the compressor, as disclosed, for example, in Japanese Unexamined Patent Publication No. 2001-25980.

Also, another type of nailer has recently been proposed which contains an electric drive mechanism (electric motor and battery) which drives a driver. This configuration eliminates the need for troublesome handling of air hose and enhances usability of the nailer. An example of such a nailer may be found in Japanese Unexamined Patent Publication No. 2007-216339, which discloses an electric nailer that uses drive means using a flywheel to drive in nails. As another example, Japanese Unexamined Patent Publication No. 2021-160028 and Japanese Unexamined Patent Publication No. 2021-171899 disclose a nailer that includes drive means using a gas cylinder to drive in nails and also includes an electric driver return mechanism of rack and pinion.

SUMMARY

However, electric nailers as disclosed in Japanese Unexamined Patent Publication Nos. 2007-216339, 2021-160028, and 2021-171899 may be undesirably heavy since containing electric motor and battery adds corresponding weight to the nailer. The user who works with such a nailer held in their hand(s) will suffer from the load (burden) of the weight of the nailer. In addition, to drive in a nail, the nailer causes the driver therein to strike the nail. Thus, the user may experience reaction to such a driving action and/or associated vibrations each time driving in a nail. This also places a heavy burden on the user.

The present disclosure has been made in view of the above problems and is directed to providing a nailer and a driver for a nailer that is reduced in weight and will produce a reduced burden on the user due to reaction to the action for driving in nails.

According to a first aspect of the present disclosure, a nailer comprises a driver having a shaft shape and configured to strike a nail positioned ready to be driven into an object; and drive means for driving the driver toward the nail, wherein the driver includes a distal end portion configured to hit the nail, a base end portion located opposite to the distal end portion, and an intermediate portion located between the distal end portion and the base end portion, and wherein the distal end portion and the base end portion are solid and the intermediate portion has a cavity.

In preferred embodiments, a driving force provided by the drive means to drive the driver toward the nail may be adjusted such that a momentum imparted to the nail when the driver hits the nail may provide a sufficient striking force required to drive in the nail.

In some embodiments, the drive means may include: a piston fixed to the base end portion of the driver, a cylinder slidably housing the piston, a pressure accumulation chamber filled with compressed gas and defined in the cylinder at an opposite side of the driver across the piston, and a return mechanism. The return mechanism may be configured to: retract the piston and the driver towards the pressure accumulation chamber and retain the piston and the driver in a standby position, when not driving in a nail, and release the retention of the piston and the driver from the standby position to allow pressure from the pressure accumulation chamber to act on the piston and the driver, when driving in a nail.

In some embodiments, the drive means may comprise an electric motor and a battery for supplying electric power to the electric motor.

According to a second aspect of the present disclosure, a driver for a nailer has a shaft shape and is configured to strike a nail positioned ready to be driven into an object, the driver comprising: a distal end portion configured to hit the nail; a base end portion located opposite to the distal end portion; and an intermediate portion located between the distal end portion and the base end portion, wherein the distal end portion and the base end portion are solid and the intermediate portion has a cavity.

In some embodiments, the cavity may be formed by a through hole that extends longitudinally through the intermediate portion.

In some embodiments, the cavity may be filled with a material that is more lightweight than a material which a body of the intermediate portion is constructed.

In some embodiments, the cavity may be provided with a reinforcing structure for improving a mechanical strength of the intermediate portion.

In some embodiments, the reinforcing structure may include a reinforcing tubular member disposed in the cavity, the reinforcing tubular member extending longitudinally through the intermediate portion.

In some embodiments, the reinforcing structure may include a plurality of protrusions formed on an inner wall surface of the cavity of the intermediate portion.

In some embodiments, the reinforcing structure may include a reinforcing member disposed in the cavity, the reinforcing member extending longitudinally through the intermediate portion and having a honeycomb structure over a transverse cross section of the intermediate portion.

In some embodiments, the distal end portion may be formed from a material having higher rigidity and wear resistance than a material out of which the intermediate portion is constructed.

In some embodiments, the distal end portion, the base end portion, and the intermediate portion may be formed as separate members and joined together through welding or brazing.

In some embodiments, the intermediate portion may be formed from a high-tensile strength steel (high-tensile steel).

In some embodiments, the outer peripheral surface of the intermediate portion may be subjected to a surface treatment to enhance sliding wear resistance of the outer peripheral surface.

According to the first aspect of the present disclosure, the nailer (e.g., nailer 1) includes a driver (e.g., driver 8) configured to strike a nail (e.g., nail 101) and including a solid distal end portion (e.g., distal end portion 22), a solid base end portion (e.g., base end portion 21), and an intermediate portion (e.g., intermediate portion 23) having a cavity (e.g., cavity 23B). Accordingly, the driver may be reduced in weight by an amount corresponding to the volume of the cavity. This may reduce the weight of the nailer and may alleviate the associated burden on the user. Furthermore, reduction in the weight of the driver, which serves as the hitting member, may lead to a corresponding reduction in the reaction experienced by the user during nail insertion. Thus, in this regard as well, the burden on the user may be reduced. On the other hand, weight reduction of the driver allows the driver to move at a correspondingly increased speed. Thus, although reduced in weight, the component including the driver (e.g., driver assembly 9) is still capable of imparting a sufficient momentum (impulse) to the nail required to drive in the nail. Therefore, the nailer according to the present disclosure may be reduced in weight and expected to impose a reduced burden on the user while maintaining an appropriate striking force required to drive in nails. This is significantly advantageous for practical use.

In addition, the drive means may be configured to provide an adjustable driving force (e.g., the gas pressure in the pressure accumulation chamber 7 may be adjusted). This configuration allows for easily optimizing of the striking force of the driver through adjustment of the speed of the driver.

The drive means may include a piston (e.g., piston 5) fixed to the base end portion of the driver, a cylinder (e.g., cylinder 4) slidably housing the piston, a pressure accumulation chamber (e.g., pressure accumulation chamber 7) defined in the cylinder, and a return mechanism configured to retract the piston and driver to the standby position. This configuration allows the speed of the driver during the nail driving operation to be easily adjusted, even if the speed of the driver during nail driving needs to be adjusted, through adjustment of the gas pressure in the pressure accumulation chamber.

The drive means (return mechanism) may further include an electric motor and a battery. In this case, the nailer is configured as an easy-to-use electric nailer. In addition, despite the inclusion of these heavy electric motor and battery, the weight reduction of the driver may refrain the weight increase of the device from becoming too large.

According to the second aspect of the present disclosure, the driver (e.g., driver 8) for a nailer includes a solid distal end portion (e.g., distal end portion 22), a solid base end portion (e.g., base end portion 21), and an intermediate portion (e.g., intermediate portion 23) having a cavity (e.g., cavity 23B). Accordingly, the driver may be reduced in weight by an amount corresponding to the volume of the cavity. This may reduce the weight of the nailer and may alleviate the associated burden on the user. Furthermore, reduction in the weight of the driver may lead to a corresponding reduction in the reaction experienced by the user during nail insertion. Thus, in this regard as well, the burden on the user may be alleviated. On the other hand, weight reduction of the driver allows the driver to move at a correspondingly increased speed. Thus, although reduced in weight, the component including the driver (e.g., driver assembly 9) is still capable of imparting a sufficient momentum (impulse) to the nail required to drive in the nail. Therefore, a nailer using the driver according to the present disclosure may be reduced in weight and expected to impose a reduced burden on the user while maintaining an appropriate striking force required to drive in nails.

The intermediate portion may include a through hole (e.g., through hole 23A) that extends longitudinally through the intermediate portion. In such an embodiment, the interior of the through hole may serve as a cavity extending through the entire length of the intermediate portion. This may increase the volume of the cavity as much as possible and may significantly reduce the weight of the driver. Furthermore, in this configuration, the intermediate portion has openings only at two ends in its longitudinal direction (no openings are formed in the sides of the intermediate portion). Accordingly, the mechanical strength of the intermediate portion may be not reduced too much, and which allows the driver to maintain a sufficient mechanical strength as hitting member.

The cavity may be filled with a material that is more lightweight than a material which the body of the intermediate portion is constructed. This allows the driver to be reduced in weight while sufficiently maintaining the mechanical strength of the intermediate portion.

The cavity may be provided with a reinforcing structure for improving the mechanical strength of the intermediate portion. This allows for increasing the mechanical strength of the intermediate portion with a limited weight increase of the driver.

The reinforcing structure may include a reinforcing tubular member (e.g., reinforcing tubular member 31) disposed in the cavity and extending longitudinally through the intermediate portion. The reinforcing tubular member may firmly support the intermediate portion from the inside and may increase the mechanical strength of the intermediate portion.

Alternatively, the reinforcing structure may include a plurality of protrusions (e.g., ribs 32) formed on the inner wall surface of the cavity of the intermediate portion. This allows the mechanical strength of the intermediate portion to be reinforced using no additional separate reinforcement members.

Alternatively, the reinforcing structure may include a reinforcing member disposed in the cavity, the reinforcing member extending longitudinally through the intermediate portion and having a honeycomb structure (e.g., a honeycomb structure 33) over a transverse cross section of the intermediate portion. This reinforcing member may be disposed in the cavity and may extend longitudinally through the intermediate portion. The honeycomb structure may be formed from lightweight sheet members (e.g., cylindrical sheet members 33A and corrugated sheet members 33B). Thus, this reinforcing member may increase the mechanical strength of the intermediate portion with a minimum weight increase of the driver.

In the driver, the distal end portion may be formed from a material having higher rigidity and wear resistance than a material which the intermediate portion is constructed. With this configuration, the driver may be structured as a lightweight and durable driver capable of performing an appropriate striking operation.

The distal end portion, the base end portion, and the intermediate portion may be formed as separate members and joined together through welding or brazing. This allows for simplified manufacturing processes of these members (in particular, forming the cavity in the intermediate portion). In addition, the driver constructed by combining these separate members may have sufficient mechanical strength.

The intermediate portion may be formed from a high-tensile strength steel. This helps to reliably establish a structure in the intermediate portion and ensure sufficient mechanical strength of the intermediate portion.

Additionally, the outer peripheral surface of the intermediate portion may be subjected to a surface treatment to enhance sliding wear resistance of the outer peripheral surface. This allows the intermediate portion to have a sufficient sliding wear resistance, even though the intermediate portion is formed from a high-tensile strength steel.

DESCRIPTION OF EMBODIMENTS

Hereinafter, embodiments of the present disclosure will be described with reference to the accompanying drawings.

Figure 1:
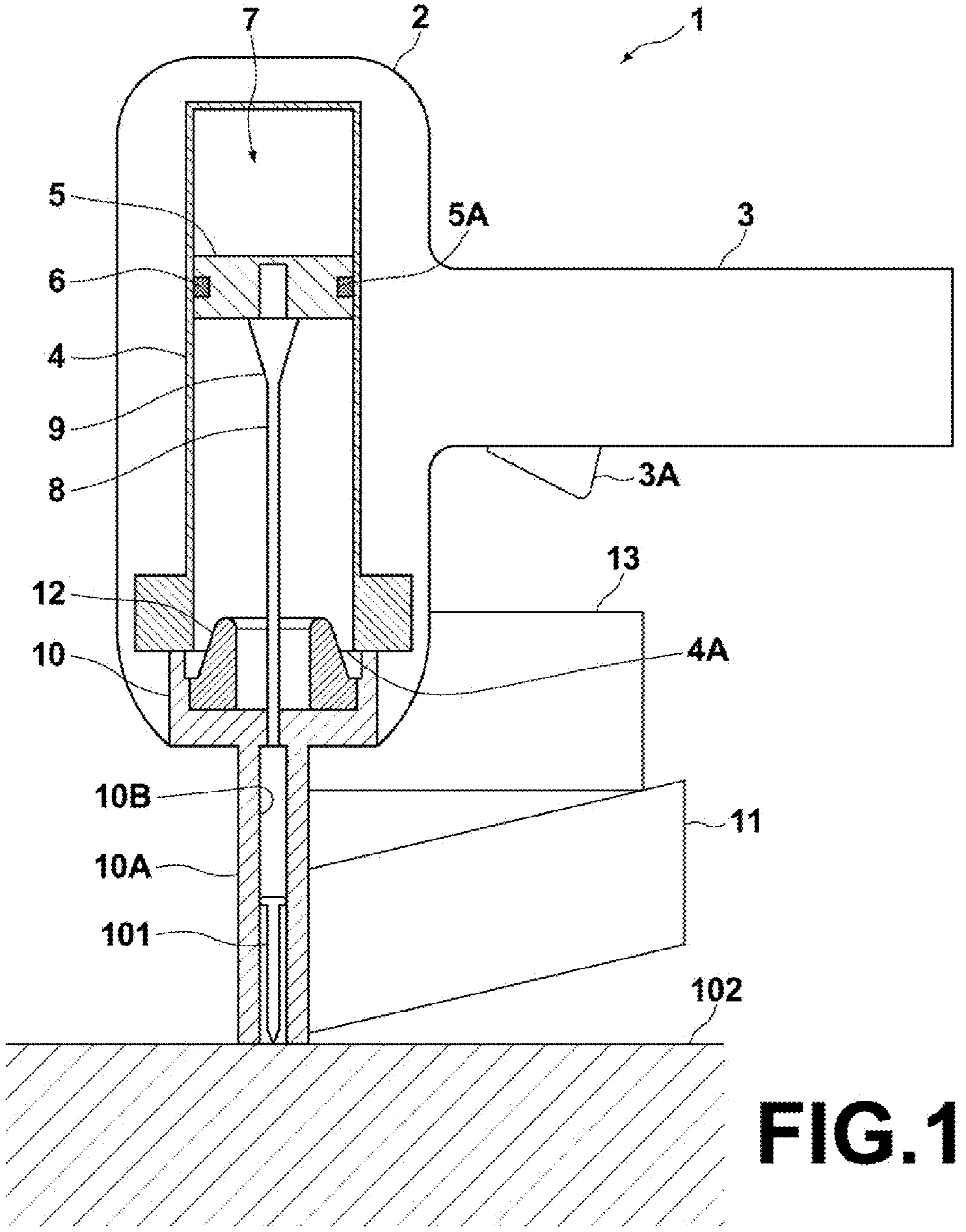
FIG. 1 a partial cross-sectional view depicting an overall configuration of a nailer having a driver in a standby position, according to embodiments of the present disclosure.
Figure 2:
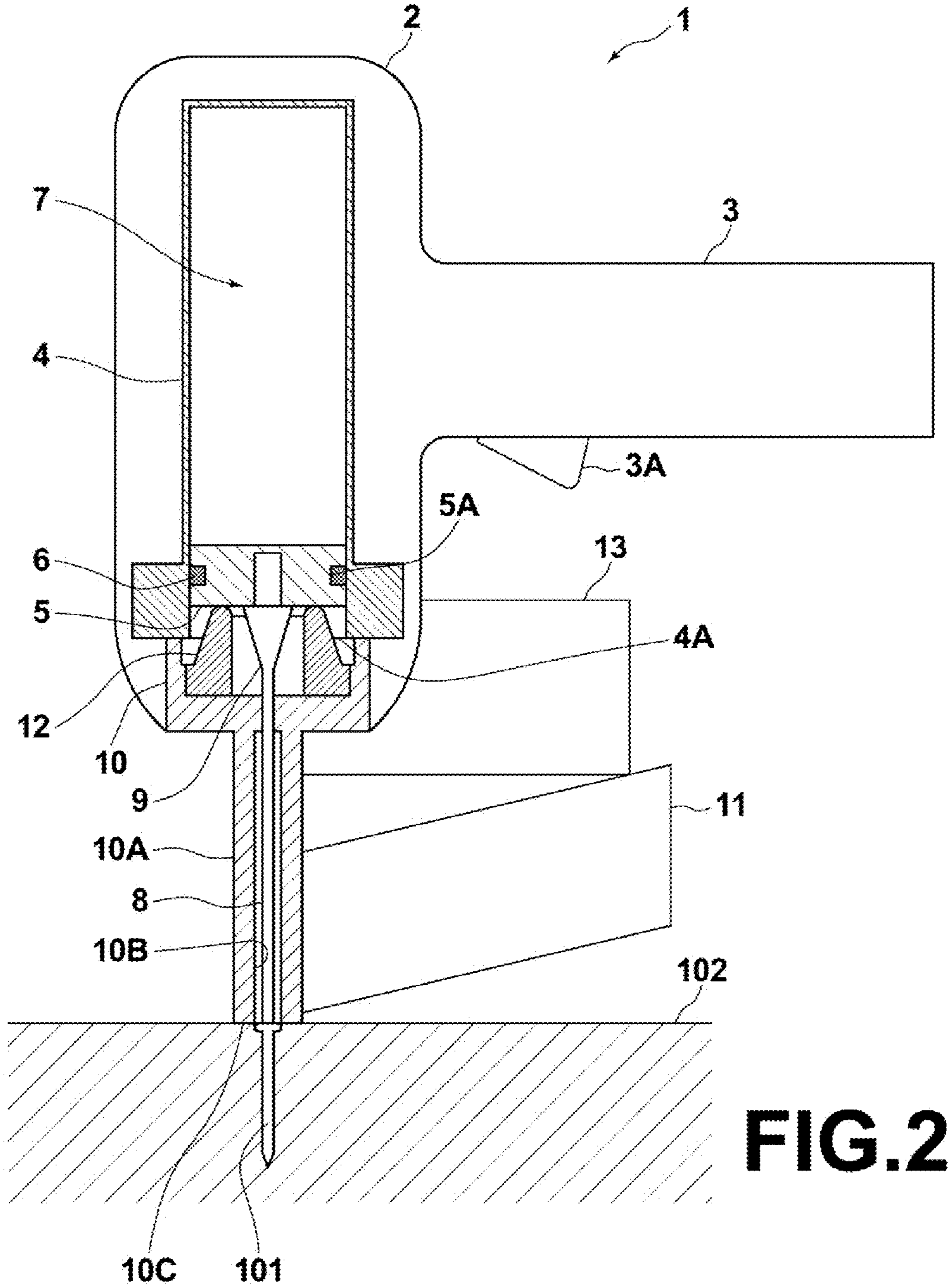
FIG. 2 a partial cross-sectional view depicting an overall configuration of the nailer of FIG. 1 after the driver has driven in a nail.

FIGS. 1 and 2 each depict the overall configuration of the nailer according to the embodiments of the disclosure. As depicted in FIGS. 1 and 2, a nailer 1 is a device for driving a nail 101 into an object 102 (e.g., building material such as wood) and includes a body casing 2 and a handle 3 provided integrally to the body casing 2.

The body casing 2 contains a cylinder 4. A piston 5 slidably disposed in the cylinder 4. A ring groove 5A is formed in the outer periphery of the piston 5 and a seal ring 6 is provided in the ring groove 5A. An airtight pressure accumulation chamber 7 is defined between the piston 5 and cylinder 4. The pressure accumulation chamber 7 corresponds to the portion, above the piston 5, of the interior of the cylinder 4. The pressure accumulation chamber 7 is filled with gas (e.g., compressed air) compressed to a predetermined pressure, such that the piston 5 may be driven by the pressure of this compressed gas (or the spring force of the gas cylinder).

A driver 8 is a shaft-shaped hammer member (hitting member) configured to strike a nail 101 positioned ready to be driven into the object 102. The driver 8 is fixed to the piston 5 and extends toward an opening 4A of the cylinder 4 (i.e., extends away from the pressure accumulation chamber 7). The piston 5 and the driver 8 constitute a driver assembly 9. More details about the driver assembly 9 will be discussed in conjunction with FIG. 3 below.

A guide member 10 is fixed to the opening 4A of the cylinder 4. The guide member 10 includes a guide nose 10A extending out of the body casing 2. The guide nose 10A has a guide passage 10B formed extending longitudinally through the guide nose 10A, allowing the driver 8 to move through the guide passage 10B.

The nailer 1 includes a nail magazine 11 for supplying nails 101. The nail magazine 11 is disposed adjacent to the guide nose 10A, such that a nail 101 to be driven for the next strike may be supplied from the nail magazine 11 to a predetermined position in the guide passage 10B of the guide nose 10A.

A damper 12 is provided to the guide member 10 on the side closer to the cylinder 4. The damper 12 is disposed in the opening 4A of the cylinder 4 and configured to absorb impact from the piston 5 by colliding with the piston 5 that has been driven toward the opening 4A of the cylinder 4 while driving in the nail 101. The damper 12 also serves as a stop to prevent any further movement of the piston 5.

The nailer 1 is provided with a drive unit 13. The drive unit 13 contains a drive mechanism (not shown) including an electric motor. The drive mechanism is configured as a return mechanism for retracting the driver assembly 9 and retaining it in a standby position. In the standby position, the driver assembly 9 is retracted within the cylinder 4 (as depicted in FIG. 1). The drive mechanism is configured to be driven by the electric motor. The retention of the driver assembly 9 by the return mechanism may be released through operation of a trigger switch 3A provided on the handle 3.

Example specific configurations of the return mechanism may be found, for example, in PTL3 (Japanese Unexamined Patent Publication No. 2021-160028) and PTL4 (Japanese Unexamined Patent Publication No. 2021-171899). Any well-known mechanism, such as the mechanism using a rack and pinion disclosed in PTL3 or PTL4, may be used as the return mechanism. A battery for supplying electric power to the electric motor may be disposed, for example, in the drive unit 13 or in the handle 3.

In order to drive a nail 101 into an object 102 using the nailer 1 having the above configuration, the driver assembly 9 may initially be retained in the standby position and the nailer 1 may be positioned such that the distal end 10C of the guide nose 10A may be aligned with a nailing-target point of the object 102, as depicted in FIG. 1. Under this condition, the trigger switch 3A may then be operated to release the retention of the driver assembly 9. This allows the gas pressure of the compressed gas to force the pressure accumulation chamber 7 of cylinder 4 to rapidly expand, which in turn pushes the driver assembly 9 onto the nail 101 in guide passage 10B, as depicted in FIG. 2. As a result, the head of the nail 101 is struck by the distal end portion 22 of the driver 8 and the nail 101 is driven out of the distal end 10C of the guide nose 10A and into the object 102.

Figure 3:
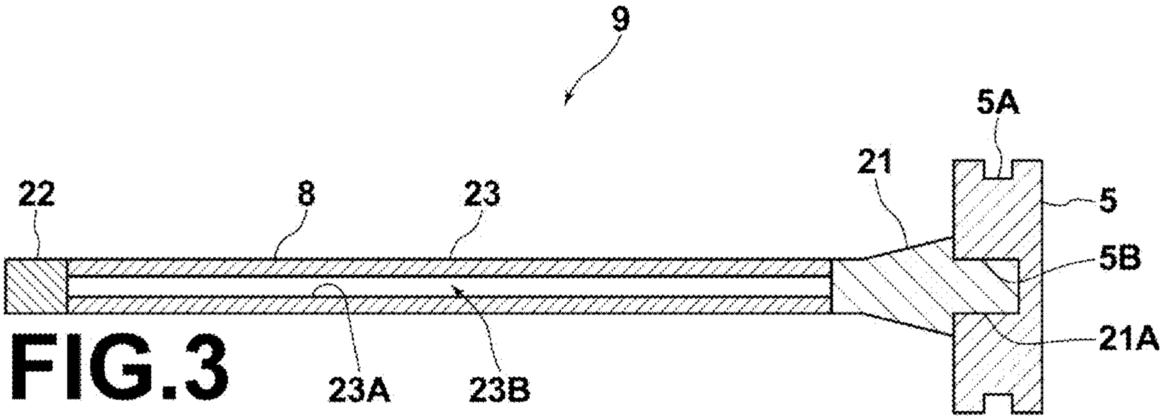
FIG. 3 a cross-sectional view of an embodiment of the driver.

FIG. 3 depicts details of the driver assembly 9. As seen in FIG. 3, the driver assembly 9 includes the piston 5, which has a substantially cylindrical shape, and the driver 8, which has a shaft shape. The driver 8 includes three portions: a base end portion 21 located next to the piston 5, a distal end portion 22 located opposite the base end portion 21, and an intermediate portion 23 located between the base end portion 21 and the distal end portion 22. The base end portion 21, intermediate portion 23, and distal end portion 22 may be independently manufactured as separate members and joined together through processing such as welding or brazing.

The base end portion 21 includes an engagement portion 21A extending away from the intermediate portion 23. The piston 5 includes an engagement hole 5B. The base end portion 21 is fixed to the piston 5 with the engagement portion 21A engaged with the engagement hole 5B. The base end portion 21 may be formed from a metallic material, such as aluminum, and structured as a solid member having no internal cavity. In other words, as a coupler of the driver 8 with the piston 5, the base end portion 21 is expected to be subject to a large bending moment during operation of the nailer 1. Accordingly, the base end portion 21 is structured as a solid member to ensure its mechanical strength and thereby to appropriately prevent the driver 8 from breaking (e.g., breaking at the base end portion 21).

The distal end portion 22 is configured to hit the head of the nail 101 and strike the nail 101 during the operation of driving in the nail 101. The distal end portion 22 may be formed from a metallic material having high rigidity and wear resistance, such as ultrahard steel (cemented carbide), and structured as a solid member having no internal cavity.

As a portion to strike the nail 101, the distal end portion 22 is required to have particularly high rigidity and wear resistance compared to the remaining portions of the driver 8. In other words, the remaining portions of the driver 8 (the intermediate portion 23 and base end portion 21) are not required to have so high rigidity or wear resistance as the distal end portion 22. Thus, the distal end portion 22 has a length far shorter than (e.g., about a factor of 15 less than) that of the remaining portion of the driver 8.

The intermediate portion 23 has a long shaft shape having a length extending over most of the entire length of the driver 8. The intermediate portion 23 has a through hole 23A that extends longitudinally through the intermediate portion 23, such that a cavity 23B is defined within the through hole 23A over the entire length of the intermediate portion 23. As a result, the driver 8 may be reduced in weight by an amount corresponding to the volume of the cavity 23B of the intermediate portion 23 as compared to an entirely solid version of the driver 8. Furthermore, in this configuration, the structure of the intermediate portion 23 is provided by the longitudinally extending through hole 23A, which has openings only at two ends in its longitudinal direction. Accordingly, the structure of the intermediate portion 23 may be achieved with a limited reduction of the mechanical strength of the intermediate portion 23, which allows the driver 8 to maintain a sufficient mechanical strength as hammer member (hitting member).

The intermediate portion 23 of the driver 8 may be made of a metal, such as a high-tensile strength steel (HTSS), a case-hardening steel, a spring steel, or a carbon tool steel (SK steel). In contrast, most conventional drivers are mainly made of die steels in view of their impact resistance, compressive strength, toughness, and sliding wear resistance. However, it may be difficult to use die steels to form the intermediate portion 23 of the driver 8 when the intermediate portion 23 has a hollow structure (i.e., when the through hole 23A (the cavity 23B) is formed in the intermediate portion 23) as disclosed herein. (a typical mold for forming the driver may be made of a die steel and is not strong enough to withstand the processes to establish such a hollow structure.) For this reason, in the present disclosure, the intermediate portion 23 of the driver 8 is formed from a metal as listed above. In particular, the intermediate portion 23 may favorably be formed from a high-tensile strength steel. This helps to reliably establish a hollow structure in the intermediate portion 23 and ensure sufficient mechanical strength (such as impact resistance, compressive strength, toughness, etc.) of the intermediate portion 23.

In embodiments in which the intermediate portion 23 of the driver 8 is formed from a material as listed above, such as high-tensile strength steel, the intermediate portion 23 may have an outer peripheral surface that is subjected to a surface treatment to improve the surface sliding wear resistance of the intermediate portion 23. This allows the outer peripheral surface of the intermediate portion 23, which is formed from a material such as a high-tensile strength steel, to have a sliding wear resistance that is comparable to when the intermediate portion 23 is formed from a die steel.

In this way, the driver 8 (driver assembly 9) according to the embodiments may be reduced in weight while maintaining sufficient striking force to drive in nails 101. In other words, the driver assembly 9 is reduced in weight, but this in turn allows the driver assembly 9 to move at a correspondingly increased speed. Thus, although reduced in weight, the driver assembly 9 is still capable of imparting a sufficient momentum (impulse) to the nail 101 required to drive in the nail 101. Therefore, the configurations of the nailer 1 and/or driver 8 according to the embodiments allow the nailer 1 to be reduced in weight without impairing its ability to drive in nails 101.

In particular, in the embodiments in which the nailer 1 uses the driver assembly 9 configured to be biased by the gas pressure (gas spring) from the pressure accumulation chamber 7, the nailer 1 is operative with lower energy losses than using other types of driver assemblies such as one configured to be driven by a compressed air from an external compressor. This is because substantially no gas leakage from the pressure accumulation chamber 7 is expected during normal operation. Therefore, it is understood that the driver assembly 9 may be operative at a sufficient speed without the need to specially configure the pressure accumulation chamber 7 to achieve a compressed gas pressure that is greatly different from that of any driver assembly that does not include the cavity 23B.

However, if the driver assembly 9 having the above configuration is not expected to be operative at a sufficient speed, the driving force of the drive means may be adjusted to increase the speed of the driver assembly 9. On the other hand, if it is desirable to configure the driver assembly 9 to operate at a lower speed, the compressed gas pressure within the pressure accumulation chamber 7 may be reduced. The nailer 1 according to the embodiments allows easily adjusting the speed of the driver assembly 9 through changing the pressure of the compressed gas within the pressure accumulation chamber 7 and adjusting the spring force of the gas spring.

As described above, the nailer 1 according to the embodiments includes the driver 8 that has the cavity 23B in the intermediate portion 23. This configuration allows the nailer 1 to be reduced in weight while maintaining a sufficient striking force required to drive in nails 101. This allows for reduction of the burden on the user due to the weight of the nailer 1. Such a burden reduction is especially advantageous for the nailer 1 that has been increased in weight by including an electric motor and a battery.

Furthermore, reduction in the weight of the driver assembly 9, which is the component that moves when the nailer 1 is used to drive in nails 101, may lead to a corresponding reduction in the reaction experienced by the user. Thus, in this regard as well, the burden on the user may be alleviated.

As described above, the driver 8 is constructed by assembling the three independent and separate members of the base end portion 21, the distal end portion 22, and the intermediate portion 23. This allows for simplified manufacturing of these members (such as machining the through hole 23A in the intermediate portion 23). In addition, the base end portion 21, distal end portion 22, and intermediate portion 23 are joined together with sufficient joining strength through processing such as welding or brazing. This allows the driver 8 to provide an overall mechanical strength sufficient to properly function as a hitting member (hammer member).

In the embodiments described herein, the cavity 23B is not filled. However, depending on the particular application, the cavity 23B may be filled with a material (e.g., a resin) that is more lightweight than the material which the body of the intermediate portion 23 is constructed. This allows the intermediate portion 23 to be reduced in weight as compared to when the intermediate portion 23 is structured as a solid member formed entirely from a single material and increases the mechanical strength of the intermediate portion 23 as compared to when the cavity 23B is not filled.

Figure 4:
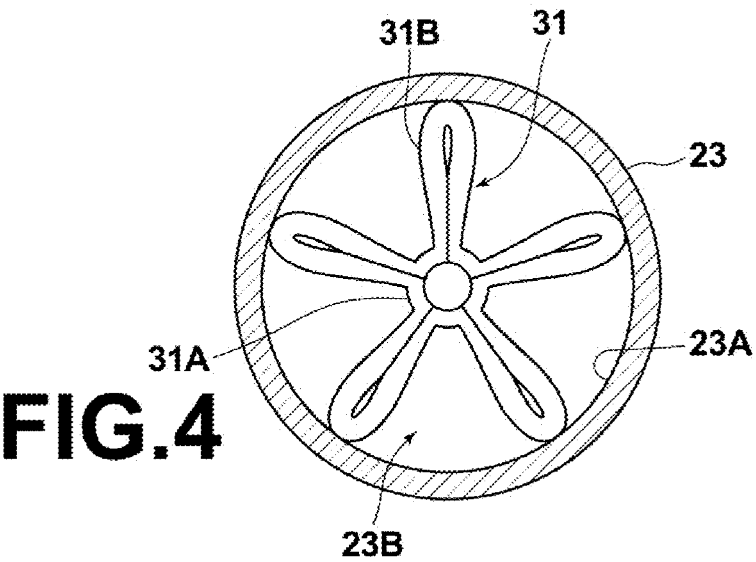
FIG. 4 a cross-sectional view of an embodiment of the driver including a reinforcing structure having a reinforcing tubular member disposed in a through hole (cavity) of the driver, the reinforcing tubular member longitudinally extending through the intermediate portion of the driver.
Figure 5:
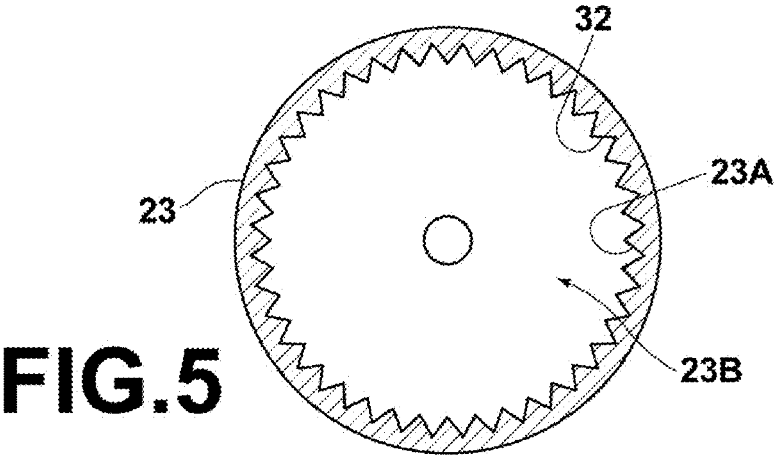
FIG. 5 a cross-sectional view of an embodiment of the driver including a reinforcing structure having a plurality of ribs formed on the inner wall surface of the through hole (cavity) of the driver.
Figure 6:
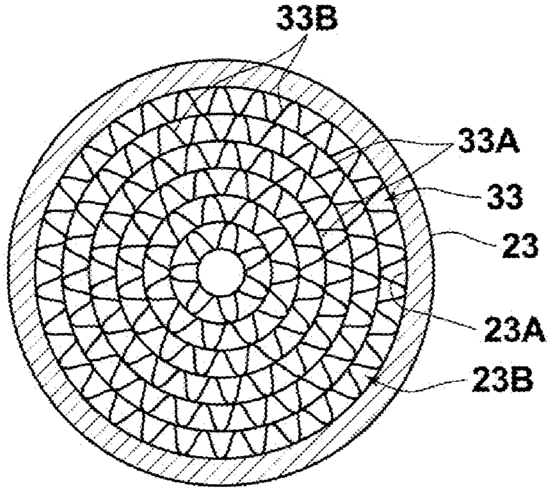
FIG. 6 a cross-sectional view of an embodiment of the driver including a reinforcing structure having a reinforcing member disposed in the through hole (cavity) of the driver, the reinforcing member longitudinally extending through the intermediate portion of the driver and having a honeycomb structure over the transverse cross section of the intermediate portion.

As depicted in FIGS. 4 to 6, in some embodiments, the cavity 23B may be provided with a reinforcing structure to provide the intermediate portion 23 with additional mechanical strength (such as impact resistance, compressive strength, toughness, and/or other strength to prevent crushing and/or bending). Providing such a reinforcing structure ensures sufficiently increasing the mechanical strength of the intermediate portion 23 while allowing the intermediate portion 23 to be more lightweight than a solid version of the intermediate portion 23 that does not have the cavity 23B.

FIG. 4 depicts an embodiment of such a reinforcing structure having a reinforcing tubular member 31 disposed in the cavity 23B. The reinforcing tubular member 31 extends axially (longitudinally) through the intermediate portion 23 such that the intermediate portion 23 has a double-tube structure. As seen in FIG. 4, the reinforcing tubular member 31 has a plurality (five in the depicted embodiment) of depressed portions 31A and a plurality (five in the depicted embodiment) of protruding portions 31B. Each depressed portion 31A may be formed by depressing a cylindrical tube toward the central axis such that each protruding portion 31B may be defined between two adjacent depressed portions 31A. All of the protruding portions 31B may have substantially the same shape (in which the tube wall is superimposed by folding). This structure allows the reinforcing tubular member 31 to contact the inner peripheral surface of the through hole 23A at the distal ends of the protruding portions 31B and support the intermediate portion 23 from the inside. In this way, the mechanical strength of the intermediate portion 23 is reinforced.

The protruding portions 31B are disposed at even circumferential intervals (symmetrically and evenly arranged) along the circumferential direction of the reinforcing tubular member 31. This ensures that the intermediate portion 23 may be firmly supported by the reinforcing tubular member 31 in a circumferentially no-bias manner.

FIG. 5 depicts an embodiment of the reinforcing structure having a plurality of protrusions (a large number of ribs 32 in the embodiment) formed on the inner peripheral surface of the through hole 23A. Each protrusion extends axially (longitudinally) along the intermediate portion 23 such that the intermediate portion 23 has a deformed-tube structure. Each rib 32 may have a ridge shape with an approximately triangular profile, for example. The ribs 32 are evenly distributed over the entire circumference of the through hole 23A. These large number of ribs 32 provide additional rigidity to the intermediate portion 23. In this way, the reinforcing structure may be formed by such a rib structure (large number of ribs 32) of the intermediate portion 23. In this structure, the mechanical strength of the intermediate portion 23 may be reinforced using no additional separate reinforcement members.

FIG. 6 depicts an embodiment of the reinforcing structure having a reinforcing member disposed in the cavity 23B. The reinforcing member extends axially (longitudinally) through the intermediate portion 23 and has a honeycomb structure 33 over the transverse cross section of the intermediate portion 23.

The honeycomb structure 33 includes a plurality of cylindrical sheet members 33A and a plurality of corrugated sheet members 33B. The cylindrical sheet members 33A may be disposed concentrically with the intermediate portion 23. Each corrugated sheet member 33B may be disposed between two adjacent cylindrical sheet members 33A. The cylindrical sheet members 33A may have different inner diameters and may be nested concentrically. Each corrugated sheet member 33B is disposed with its crests and troughs in contact with the adjacent cylindrical sheet members 33A.

Thus, by employing the honeycomb structure 33 for reinforcing the intermediate portion 23, the intermediate portion 23 may be firmly reinforced along the entire circumference in a balanced manner. Furthermore, the cylindrical sheet members 33A and corrugated sheet members 33B constituting the honeycomb structure 33 may be lightweight, so that addition of the honeycomb structure 33 will cause a minimum weight increase in the driver 8.

While various embodiments have been described for purposes of this disclosure, such embodiments should not be deemed to limit the teaching of this disclosure to those embodiments. For example, in the above embodiments, the nailer 1 has been described as being a gas cylinder nailer. However, the scope of the present disclosure is not limited to such embodiments. The present disclosure is also applicable to other types of nailers, such as a nailer that uses a driver configured to be driven by air pressure from an independent compressor separate from the nailer body, or a nailer that uses a driver configured such that all the operation of the driver, including the operation to drive the driver toward the nail, are fully driven by an electric motor.

INDUSTRIAL APPLICABILITY

The present disclosure is applicable to nailers for use during construction and other similar processes.

EXPLANATION OF THE REFERENCE NUMERALS

1 nailer
2 body casing
3 handle
3A trigger switch
4 cylinder
5 piston
5A ring groove
5B engagement hole
6 seal ring
7 pressure accumulation chamber
8 driver

9 driver assembly
10 guide member
10A guide nose
10C distal end of the guide nose
10B distal end of the guide nose
11 nail magazine
12 damper
13 drive unit
21 base end portion of the driver
21A engagement portion
22 distal end portion of the driver
23 intermediate portion of the driver
23A through hole
23B cavity
31 reinforcing tubular member
31A depressed portion
31B protruding portion
32 rib
33 honeycomb structure
33A cylindrical sheet member
33B corrugated sheet member
101 nail
102 object

The invention claimed is:

1. A nailer comprising:

a driver having a shaft shape and configured to strike a nail positioned ready to be driven into an object; and drive means for driving the driver toward the nail, wherein the driver includes a distal end portion configured to hit the nail, a base end portion located opposite to the distal end portion, and an intermediate portion located between the distal end portion and the base end portion, and wherein the distal end portion and the base end portion are solid and the intermediate portion has a cavity.

2. The nailer according to claim 1, wherein a driving force provided by the drive means to drive the driver toward the nail is adjusted such that a momentum imparted to the nail when the driver hits the nail provides a sufficient striking force required to drive in the nail.

3. The nailer according to claim 2, wherein the drive means comprises an electric motor and a battery for supplying electric power to the electric motor.

4. The nailer according to claim 1, wherein the drive means includes:

a piston fixed to the base end portion of the driver, a cylinder slidably housing the piston, a pressure accumulation chamber filled with compressed gas, the pressure accumulation chamber being defined in the cylinder at an opposite side of the driver across the piston, and a return mechanism configured to:

retract the piston and the driver towards the pressure accumulation chamber and retain the piston and the driver in a standby position, when not driving in a nail, and release the retention of the piston and the driver from the standby position to allow pressure from the pressure accumulation chamber to act on the piston and the driver, when driving in a nail.

5. The nailer according to claim 4, wherein the drive means comprises an electric motor and a battery for supplying electric power to the electric motor.

6. The nailer according to claim 1, wherein the drive means comprises an electric motor and a battery for supplying electric power to the electric motor.

7. A driver for a nailer, the driver having a shaft shape and configured to strike a nail positioned ready to be driven into an object, the driver comprising:

a distal end portion configured to hit the nail;

a base end portion located opposite to the distal end portion; and an intermediate portion located between the distal end portion and the base end portion, wherein the distal end portion and the base end portion are solid and the intermediate portion has a cavity.

8. The driver for a nailer according to claim 7, wherein the cavity is formed by a through hole that extends longitudinally through the intermediate portion.

9. The driver for a nailer according to claim 7, wherein the cavity is filled with a material that is more lightweight than a material which a body of the intermediate portion is constructed.

10. The driver for a nailer according to claim 7, wherein the cavity is provided with a reinforcing structure for improving a mechanical strength of the intermediate portion.

11. The driver for a nailer according to claim 10, wherein the reinforcing structure includes a reinforcing tubular member disposed in the cavity, the reinforcing tubular member extending longitudinally through the intermediate portion.

12. The driver for a nailer according to claim 10, wherein the reinforcing structure includes a plurality of protrusions formed on an inner wall surface of the cavity of the intermediate portion.

13. The driver for a nailer according to claim 10, wherein the reinforcing structure includes a reinforcing member disposed in the cavity, the reinforcing member extending longitudinally through the intermediate portion and having a honeycomb structure over a transverse cross section of the intermediate portion.

14. The driver for a nailer according to claim 7, wherein the distal end portion is formed from a material having higher rigidity and wear resistance than a material which the intermediate portion is constructed.

15. The driver for a nailer according to claim 7, wherein the distal end portion, the base end portion, and the intermediate portion are formed as separate members and joined together through welding or brazing.

16. The driver for a nailer according to claim 7, wherein the intermediate portion is formed from a high-tensile strength steel.

17. The driver for a nailer according to claim 16, wherein the outer peripheral surface of the intermediate portion is subjected to a surface treatment to enhance sliding wear resistance of the outer peripheral surface.

* * * * *